Figure 1:
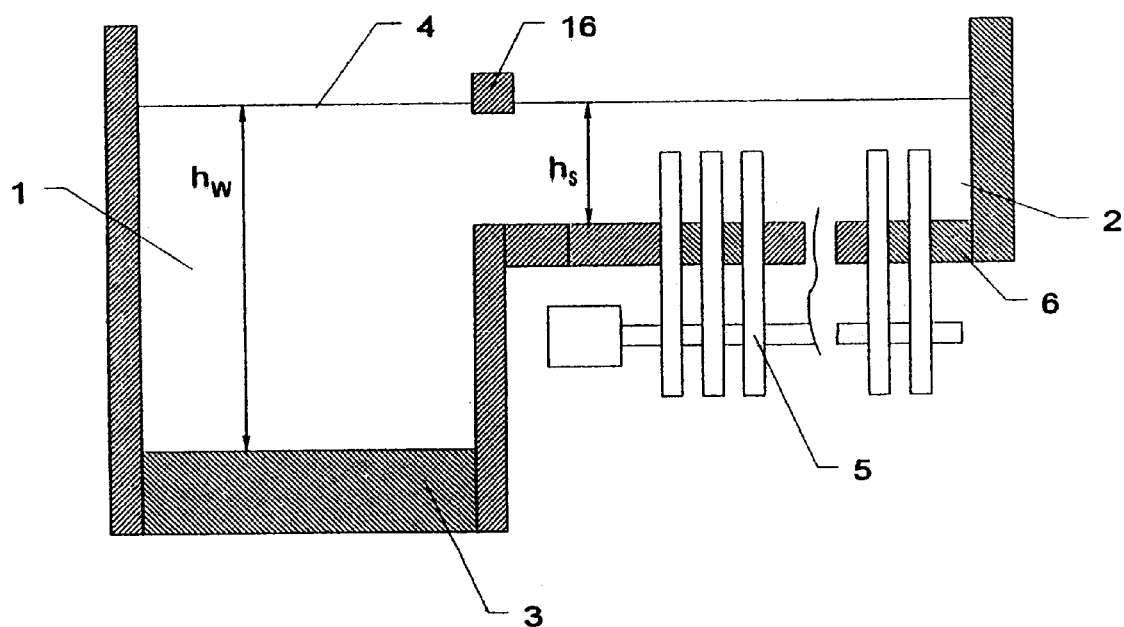

United States Patent [19]
Gorobinskäya et al.

[11] Patent Number: 6,125,660
[45] Date of Patent: Oct. 3, 2000

[54] METHOD FOR MANUFACTURING MINERAL FIBRES

[75] Inventors: Valentina Gorobinskäya, Ul. Wassilomko 25, Kiew 252125, Ukraine; Dirk Thamm, Berlin, Germany; Irina Kravtchenko, Jena, Germany; Dalik Sojref, Berlin, Germany; Alexander Medwedjew, Kiew, Ukraine

[73] Assignees: Gerhard Bürger, Hildeshem, Germany; Valentina Gorobinskäya, Kiev, Ukraine

[21] Appl. No.: 09/051,379
[22] PCT Filed: Oct. 9, 1996
[86] PCT No.: PCT/DE96/01974
§ 371 Date: Apr. 9, 1998
§ 102(e) Date: Apr. 9, 1998
[87] PCT Pub. No.: WO97/13729
PCT Pub. Date: Apr. 17, 1997

[30] Foreign Application Priority Data

Oct. 9, 1995 [DE] Germany ............ 195 38 599

[51] Int. Cl.⁷ .............. C03B 37/075; C03B 37/095
[52] U.S. Cl. .............. 65/474; 65/475; 65/479; 65/482; 65/502
[58] Field of Search .............. 65/474, 479, 482, 65/502, 475

[56] References Cited

U.S. PATENT DOCUMENTS 3,589,879  6/1971  Yantsev et al. ............ 65/128
3,985,530  10/1976  Hynd .
4,146,375  3/1979  MacPherson et al. ............ 65/474
4,199,336  4/1980  Rittler .
4,675,039  6/1987  Huey et al. .
5,352,258  10/1994  DeGreve et al. ............ 65/474

FOREIGN PATENT DOCUMENTS 248 881  7/1986  Czechoslovakia .
0388392  9/1990  European Pat. Off. .
1923345  11/1970  Germany .
2938421  9/1979  Germany .
4332532  9/1993  Germany .
WO92/21628  12/1992  WIPO .

*Primary Examiner*—James Derrington
*Attorney, Agent, or Firm*—Collard & Roe, P.C.

[57] ABSTRACT

The invention relates to a process for the manufacture of, in particular, continuous mineral fibers from rock, glass-containing technical wastes, technical glass wastes, and to an apparatus. The object of the invention is to create a process which enables the said group of starting materials to be processed from a stable melt to give, in particular, continuous fibers and thus to improve fiber quality and processability. The starting products are melted in a melting bath, transferred to a forehearth, a feeder device and then fed to a bushing device and from there taken off as thread, the melt being fed to the feeder device from a take-off area of the melt in which the melt has the parameters according to the invention of temperature, processing range, viscosity, quotient of viscosity and surface tension and energy of activation of viscous flow of the melt, and the ratio of height of the melt in the forehearth to the height of the melt in the melting bath being in a defined range.

19 Claims, 3 Drawing Sheets

METHOD FOR MANUFACTURING MINERAL FIBRES

The invention relates to a process for the manufacture of mineral fibres, in particular continuous mineral fibres, from rock, glass-containing industrial wastes and technical glass wastes, and an apparatus for carrying out the process.

Silicate fibres which have solidified in the vitreous state are customarily termed mineral fibres. These include glass fibres and fibres of silicate raw materials. A distinction is made in the broadest sense between short fibres (staple fibres, discrete fibres, rock wool) and continuous fibres.

Mineral fibres are widely used in various areas of technology and new fields of use/applications are currently constantly being developed. The numerous potential methods for producing mineral fibres having optimum properties have doubtless not yet been completely developed. One reason is the variety of potential uses with the corresponding variety of specific requirements of fibre properties.

The production of mineral/glass fibres for the most varied applications is well developed. In such cases, the composition of the glasses and the parameters of the fibres are matched to the particular application. The development of novel mineral fibres which can be produced, processed (and afforded) industrially, is an extremely multiparametric problem in which a multiplicity of optimization tasks must be solved. Only some important factors to be taken into account may be mentioned selectively, such as the number and form of the starting components, homogeneity, temperature profile, viscosity-temperature relationship, tendency to crystallization, processing range, surface tension, technological limits, fibre properties etc. Although these objects may be solvable technologically, they frequently require unjustifiable economic expenditure.

The most widespread/most widely used mineral fibres are without doubt glass fibres. This applies in particular to continuous fibres. In the production of the known glass fibres, raw materials are used which are ecologically hazardous, or their isolation/production and their use as glass raw material leads to environmental pollution. Furthermore, the availability of certain glass raw materials is restricted, and their costs are constantly increasing. Making glasses by melting mixtures of raw materials is associated with a high energy expenditure and requires extensive measures for purifying the exhaust gases resulting in the melting.

On the other hand, it is known that some, occasionally widespread, types of rock, and industrial wastes, such as slags, ashes and dusts, because of their chemical composition, can be used for glass production.

Wastes of technical glasses, such as television picture tubes, computer monitors, luminescent lamps and other glasses used in electronics are generally stored to date as special waste in landfills; in certain cases, this applies even to the wastes arising in production and processing. On the other hand, these glasses contain components which advantageously affect the physico-chemical properties of glass filaments or glass fibres produced therefrom.

Use of rocks for the manufacture of various types of mineral wools is known. However, the corresponding melts have a high tendency to crystallization and a viscosity-temperature dependency which enables forming (fibre formation) only in a very narrow temperature interval. As a result of the intensive melt coloration, the thermal conductivity within the melt is low and, in comparison to the melts used in glass fibre production, an altered heat radiation behaviour is produced, and, resulting therefrom, other conditions in the heat and mass flows within the melt.

Rock melts are also differentiated from the glass melts with regard to the wetting behaviour of the Pt and PtRh bushing material. In order to overcome the flooding of orifice plate of the bushing device, higher viscosities (i.e. lower temperatures) must be employed. This increases the risk of melt crystallization, and the productivity falls.

Conventionally, to produce continuous fibres, the rock raw materials are melted with addition of other components in order to modify the melt properties in a desired manner and to adapt them to the particular processing and forming technology.

A process has been disclosed for the manufacture of continuous mineral fibres from basalt rock, in which up to 4% $TiO_2$ is used as additive. The properties of the fibres and the stability of the fibre drawing process achieved restrict the processability and the possible uses (Czech Patent 248881).

In addition, a number of processes for the manufacture of continuous rock fibres on a laboratory scale have been disclosed. For example, the process according to U.S. Pat. No. 4,199,336 describes the production of basalt ceramic fibres, in which a melt is produced from predominantly basalt-containing material, and a monofilament fibre is drawn from the melt via a nozzle. This fibre is crystallized by an additional heat treatment.

The use of industrial residues such as metallurgical slags, ashes and dusts for the manufacture of mineral fibres is also known. In this case, in the melting and fibre-formation process, the problems already mentioned above for rocks occur. Moreover, for these raw materials, great variations in the chemical composition, both within a batch and also between batches, are characteristic. This makes the formation of a homogeneous melt suitable for fibre formation additionally difficult. Staple fibres/mineral wools are predominantly produced from these materials. For this, these substances are used as a raw material component of a glass mixture, or various additives are also added.

Wastes of technical glasses, such as tv tubes, monitors, fluorescent lamps, after the separation of the non-glass-containing constituents and/or constituents insoluble in the glass melt, can likewise be used for the manufacture of continuous fibres or staple fibres. However, the chemical composition of such wastes is not uniform and is subject to variations. These wastes contain ecologically hazardous chemical elements, such as Pb, Sr, Ba, etc., for which reason they are disposed of as special waste. By complex chemical and physical processes these pollutants can be converted into a harmless or bound state. The residues of a processing of such a procedure are less suitable for being processed to high-grade products, however.

In contrast, the object underlying the invention is to create a process which enables the above mentioned group of starting materials to be processed to give fibres, in particular to give continuous fibres, from a stable melt and thus to improve the quality of mineral fibres and their textile processability, and to provide an apparatus for carrying out the process.

According to the invention, this object is achieved by means of the fact that, after the mechanical separation of non-glass-containing and predominantly glass-containing products a) the predominantly glass-containing products having a particle size of less than 80 mm are melted in a melting bath, where the melting bath is connected to a forehearth in such a manner that flow of the melt from the melting bath into the forehearth is enabled between melting bath and forehearth in the surface region of the melt;

b) the melt is fed from the forehearth to a feeder device;

c) the melt is fed from the feeder device to a bushing device arranged there below and is taken off from there as filament with simultaneous solidification; where d) the melt is fed to the feeder device according to b) from a take-off area of the melt in which the melt has the following parameters:

d1) the temperature of the melt is in the range from 1050 to 1480° C., d2) the processing range of the melt is 40 to 100 K, d3) the melt viscosity at 1450° C. is 30 to 160 dPa.s, d4) the melt viscosity at 1300° C. is 200 to 1500 dPa.s, d5) the quotient of the viscosity (in Pa.s) and the surface tension (in N/m) is between 10 and 100, d6) the energy of activation of the viscous flow of the melt is no greater than 290 kJ/mol; and e) the ratio of the height ($h_S$) of the melt in the forehearth to the height ($h_W$) of the melt in the melting bath ($h_S$):($h_W$)= (0.8 to 1.1):(2 to 6).

It is further advantageous if the quotient of the area ($F_W$) of the melt surface in the melting bath and the surface ($F_S$) of the melt surface in the forehearth ($F_W$):($F_S$) is 0.5 to 1.5.

It is further advantageous if the ratio of the width ($B_S$) of the forehearth to the width ($B_W$) of the melting bath ($B_S$): ($B_W$)=(0.8 to 1):(5 to 12).

An advantageous value for the above mentioned ratio ($h_S$):($h_W$) is (0.8 to 1):(2.5 to 5).

An advantageous value for the above mentioned ratio ($F_W$):($F_S$) is 0.6 to 1.3.

The term "rock" used here is taken to mean basic and ultrabasic rocks such as basalt, diabase, andesite, amfibolite, pyroxene, porphyrite etc., which have formed in the solidification and crystallization of magma (eruptive or extrusive rocks), are a complicated silicate system which contains alkali metal oxides and alkaline earth metal oxides and is characterized by a high content of iron oxides (up to 15%).

"Glass-containing industrial wastes" denote solid industrial wastes which principally comprise a vitreous phase or which form a vitreous melt or which dissolve in a glass melt. These include slags, ashes and dusts, Technical glasses are used in many products of modern technology, e.g. in electroengineering, electronics and the chemical industry. The wastes arising in the production of such products and at the end of the life of these products (lamps, tubes, etc.) comprise glass as an important constituent (but also metals, plastics and other materials). In the context of the invention, wastes of this type are termed "technical glass wastes". In addition, these include the glass wastes arising in glass production, which cannot always be used directly in glass production.

Extensive studies have found that melts whose rheological behaviour (e.g. viscosity, viscosity-temperature dependency, activation energy) and whose complex of physico-chemical properties (e.g. surface tension, wetting behaviour) are characterized by the above mentioned parameters are successfully processed according to the invention to give mineral fibres, in particular continuous fibres. Particularly advantageously, these parameters are in the following limits:

a) the processing range of the melt is 60 to 80 K b) the viscosity at 1450° C. is 40–150 dPa s, c) the viscosity at 1300° C. is 200–1000 dPa s d) the quotient of viscosity and surface tension is 10 to 100 (s/m)

e) the energy of activation of viscous flow is no greater than 270 kJ/mol.

In this case the temperature of the melt is in the range from 1050 to 1480° C. and the difference between the lower processing temperature and the liquidus temperature of the melt is not less than 50 K.

The processing range is taken to mean the temperature interval on the viscosity-temperature relationship in which fibre formation by the melt is possible.

If the melt parameters deviate from these values, stable fibre-formation and fibre-drawing processes are not achieved.

According to the intensive colour, particularly of the melt from rocks and industrial wastes, inter alia due to the high iron oxide content, the temperature distribution over the height of the melt in the melting bath and in the feeder differs considerably from those known in the production of glass fibre. The cooling rate of the melts in the upper layers of the melt is several times higher than in the case of the "transparent" glass melts used for the production of fibre. The mass transfer and heat exchange conditions in the "black" melts (degree of blackness up to 0.9) differ considerably from the conditions known from glass processing. Thus, owing to the high heat radiation of the melt, a "crust" of solidified melt can form which makes the heat exchange between the hot burner gases and the lower lying melt layers more difficult. Ultimately, a high temperature gradient over the height is characteristic of the zone near the surface.

In a weakened form, altered conditions with respect to melt homogeneity also result in the case of glass wastes.

Surprisingly, it has been found that, in the take-off of the melt for the fibre-formation process, a stable fibre-drawing process can be achieved by the combination of a defined take-off area, defined melting parameters and defined structural arrangements.

The take-off region is located within the melt situated in the forehearth. The rheological behaviour and the complex of the physico-chemical properties of the melt within the take-off region are essentially described here by the above mentioned melt parameters.

According to the invention, the melt is taken off for the fibre-formation process by a flow feeder. This flow feeder comprises a tube or group of tubes, the tube (the tubes) being positioned through the bottom of the forehearth in such a manner in the melt that the melt enters the tube (tubes) from the take-off area. From the upper part of the tube, the melt flows essentially isothermally for forming into a Pt—Rh bushing (which is here generally also termed bushing device). In the bushing device, the melt is formed to give fibres and drawn via a thread winder device. The fibres customarily have a diameter between 2 and 35 μm. For textile processing, fibres having diameters of 5–25 μm are particularly suitable.

In a development of the process, the fibres are coated with a sizing. For this purpose, the fibres are conducted via a sizing applicator.

The breakage rate is decreased and the quality of the mineral fibres and thus of their textile processability is improved by means of the fact that, in the process for the manufacture of mineral fibres, the melt is taken off by the feeder device for forming in such a manner that the depth of submergence of the feeder device, measured from the bottom of the forehearth, is chosen in such a manner that the quotient of the depth of submergence ($h_{ET}$) and of the height of the melt of the upper edge of the feeder device ($h_0$) is $h_{ET}/h_0$=0.25 to 4.

At a greater depth of submergence (quotient>4), overheated melt, whose viscosity is too low, enters the tube. This leads to variations in fibre thickness and ultimately to an increase in the breakage rate. A melt which is taken off at an insufficient depth of submergence has a low temperature and a viscosity which is too high for fibre formation. In addition, crystals can grow in the melt, which lead to interruption in the fibre-drawing process.

Owing to the arrangement according to the invention of the process to the effect that melt can additionally enter into the interior of the tubes through orifices in the curved surface (of the tube or tubes) of the flow feeder, the feed of a still more homogeneous melt into the fibre-drawing region is achieved, in addition the influence of variations of temperature and temperature distribution in the melting bath which unavoidably result from the charging of the starting materials is decreased and crystallization in the nozzle meniscus is virtually completely excluded. In this case, continuous filaments of high quality can be produced, and breakage rates of 0.9 filament breaks per kg of fibre are achieved. The productivity of a forming unit is 150 kg/day.

In an advantageous development of the process, a multiplicity of flow feeders can be used, which are movable individually or as a group and operate in accordance with the above mentioned quotient. In addition, the melt can enter the flow feeder, in addition to through its upper orifice, also through lateral orifices in the curved surface of the tube (of the flow feeder).

An advantage of the process is that, in a single-stage process, mineral fibres can be produced from the rocks (e.g. basalt) without addition of additives. Since the rocks used have a relatively constant composition within a deposit, they can be melted directly. This reduces the energy consumption in comparison to fusion from a multicomponent mixture, since the rocks are solidified melts. The stages of silicate formation, homogenizing and refining the melt, which are necessary in melt fusion from a batch and require a high energy consumption, are, in the case of the starting materials used in accordance with the invention, unimportant, or important only to a certain extent. In the use of multicomponent batch for the manufacture of glass melts, problems arise with respect to the homogeneous mixing of the components and the stability of the batch (delamination). This disadvantage is avoided by using a single-component batch.

The particle size used of the starting materials is selected on the basis of the possibility of uniform batching and charging into the melting bath and the restriction of the temperature fluctuations in the melting bath caused by the charge of the raw materials.

When fine-grained material is used, the amount of energy and time required for the incorporated air to escape and the melt to be homogenized increases. According to the invention, a homogeneous melt is produced from the above mentioned starting materials and is provided for forming/fibre formation by the geometric dimensions of the melting bath and the forehearth being selected and matched to one another in such a manner that this melt can form and, in particular, stable flow conditions exist without pulsations and fluctuations, the melt being taken off in the above-described take-off area and the feeder device (flow feeder or feeder block) transports the melt essentially isothermally to the bushing device (bushing or nozzle plate). The geometry here has an influence on the state of the melt conforming in a desired manner with the requirements resulting from the complex processes of the drawing process in the bushing device.

Together with the peculiarities of the chemical composition and the specific properties, in particular the low heat transmission of the "black" melts, the melt apparatuses used for the production of glass fibres are unsuitable, in particular with respect to their geometric dimensions and ratios.

In the production of glass fibres, a distinction is made between single- and two-stage processes. In the single-stage process, the melts are produced from a multicomponent batch and formed to give fibres via a bushing device. The melting baths of these apparatuses are subdivided into a melting zone, refining zone and conditioning zone. The conditioning zone can also be moved out into the forehearth. Melting baths of this type are oversized for the melting according to the invention, since the conditions for the homogenization of the melt made of the starting materials used are more favourable in comparison to the multicomponent batch. The stages of silicate and glass formation and the refining are omitted or proceed more rapidly and with lower energy consumption.

In the more widespread two-stage processes, a glass is produced in the first stage which is shaped into marbles. In the second stage, the marbles are melted in a melting unit and glass fibres are drawn via a bushing device. This unit is unsuitable for melting the starting materials according to the invention, since sufficient homogenization of the corresponding melts cannot be ensured.

In order to ensure the admission of a homogeneous melt into the forehearth, the ratio of the melt surface in the melting bath to the area of the melt surface in the forehearth should be 0.5–1.5. The use of an apparatus of this type ensures, with optimum fuel consumption and optimum temperature conditions in the melt, stable transport of the homogeneous melt to the forehearth and to the feeder device and consequently a stable fibre-formation process with a reduced breakage rate.

With a ratio less than 0.5, crystalline inclusions can pass from the melting bath into the forehearth and can considerably interfere with, or even interrupt, the fibre-formation process.

Increasing the ratio above 1.5 requires a higher fuel consumption, since in this case the area of the melt surface in the melting bath increases sharply in comparison with the area in the forehearth. However, the productivity of the apparatus is essentially determined by the size of the forming region. By this means, with the same productivity, more starting material is fed to the melting bath and the specific energy consumption increases.

The ratio of the widths of the melting bath and the forehearth plays an important role in a uniform feed of the melt or forming. In this case, the width is taken to mean the dimension of the melting bath or the forehearth lying perpendicularly to the direction of the main stream of the melt in the melting apparatus consisting of melting bath and forehearth.

At a ratio of the width ($B_S$) of the forehearth to the width of the melting bath ($B_W$) of (0.8 to 1): (5 to 12), a uniform feed of the melt into the forehearth is ensured and pulsation of the melt is prevented. By this means, the take-off of the melt is stabilized by the feeder device.

With a melting bath which is too narrow ($B_W<5$), pulsation of the melt inflow into the forehearth can occur, and uniform feed of the melt from the take-off area is no longer ensured. An excessively wide melting bath reduces the flow velocity, and "dead zones" with respect to the flow can form. As a result the risk of melt crystallization increases, and maintaining the necessary temperature procedure requires a higher energy consumption.

The ratio of the height of the melt in the melting bath and in the forehearth is of extraordinary importance for the design/construction of the take-off area, particularly with regard to the technical feasibility of melt take-off through the feeder device. A ratio of the height ($h_S$) of the melt in the forehearth to the height ($h_W$) of the melt in the melting bath corresponding to ($h_S$):($h_W$)=(0.8 to 1.1):(2 to 6) has proved to be advantageous, in particular (0.8 to 1):(2.5 to 5).

The height of the melt in the forehearth is restricted, because of the peculiarities mentioned of the temperature distribution along the height of the melt. For the manufacture of continuous mineral fibres, melt heights between 40 and 80 mm have proved to be useful for rocks. For the vitreous wastes, continuous fibres can be drawn at melt heights between 40 and 70 mm. In the case of industrial glass wastes, melt heights of 60–100 mm have been employed for continuous fibres.

A peculiarity of producing fibres from rocks is their high iron oxide content, with the ratio of $Fe_2O_3$ to FeO, for example, being in the range (1.93–10.8):(1.17:11.8), the content of the two components being able to be up to 15% by weight. The both iron oxides act in a complicated manner on the melt state: the $Fe^{2+}$ and $Fe^{3+}$ influence the intensity of melt coloration, its viscosity and crystallization behaviour. $Fe^{2+}$ colours the melt 15 times more intensively than $Fe^{3+}$, with $Fe^{3+}$ e.g. the melt viscosity is decreased, and $Fe^{2+}$ makes the melt more viscous. At the same time, it is known that $Fe^{3+}$ influences the crystallization processes (increase in crystal nucleation and in crystallization growth rate).

Thus, by controlling the redox conditions in the melting bath, and in the processing, the ratio $Fe^{2+}/Fe^{3+}$ can be set in such a way that, by converting $Fe^{2+}$ into $Fe^{3+}$, the intensity of the coloration (darkness) of the melt is decreased and thus the heat transfer to the lower layers of the melt is improved. In addition, by this means, the viscosity behaviour of the melt in the forehearth is influenced.

To stabilize the temperature procedure and ensure a high fibre quality, it has also proved to be advantageous to perform the melting under oxidizing conditions. However, it can also be carried out under neutral or reducing conditions.

It is known that the ratio $Fe^{2+}/Fe^{3+}$ has an influence on the properties (e.g. thermal resistance and dielectric properties) of these fibres. Thus, an additional possibility for modifying the fibre properties results from controlling the redox conditions via the ratio of fuel/oxygen.

Figure 2:
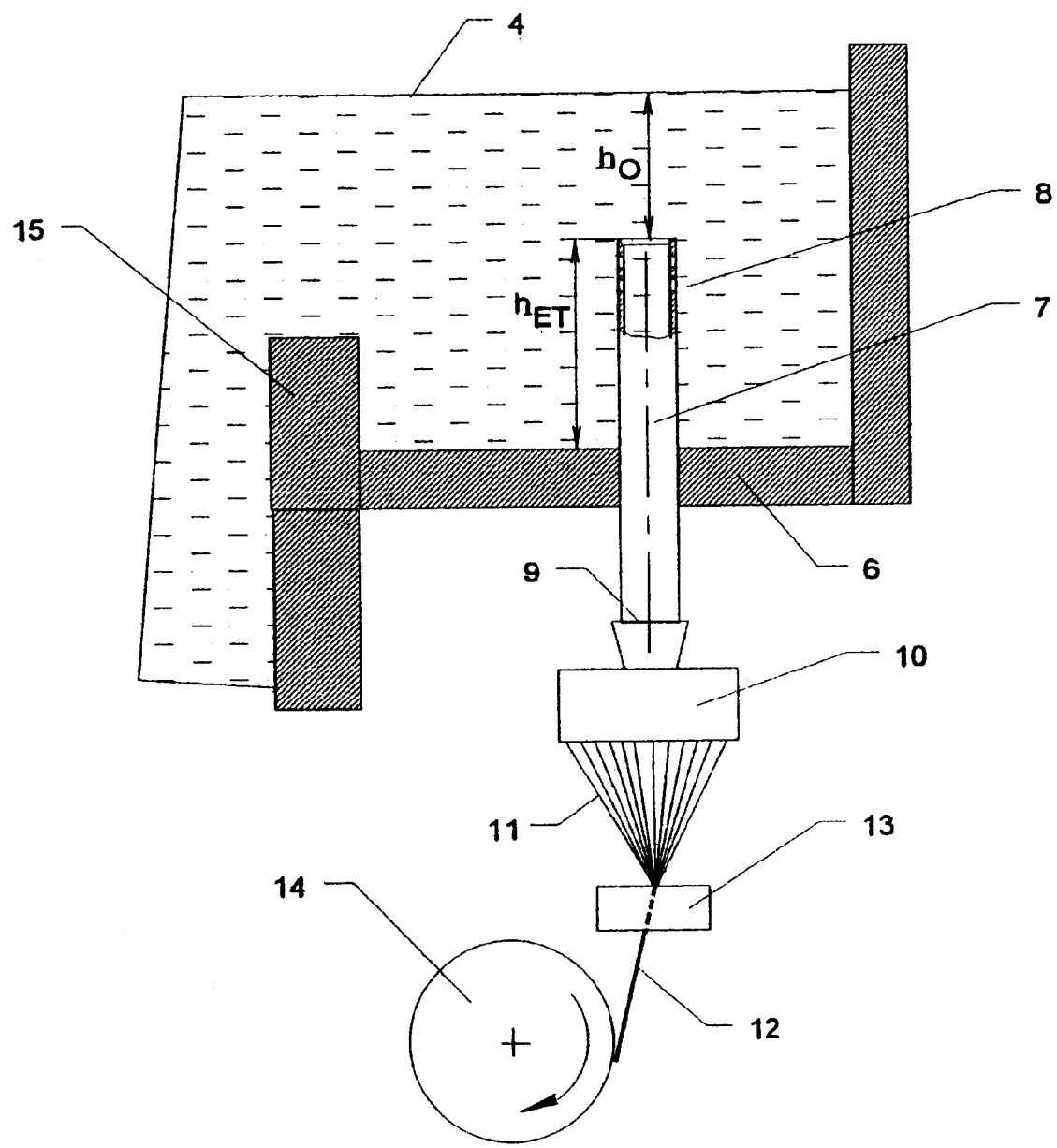
Figure 3:
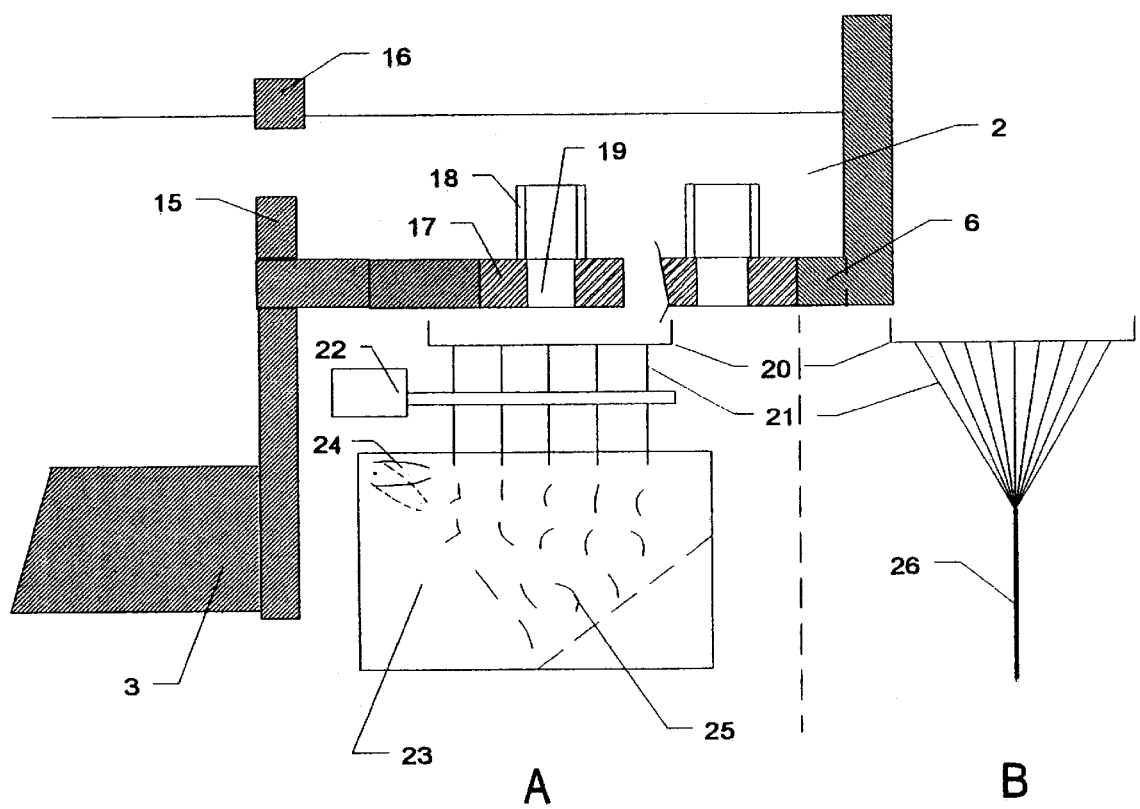

The invention also relates to an apparatus for carrying out the process. This subject-matter of the invention is described in more detail by the drawing. In the drawing FIG. 1 shows a diagrammatic representation of an apparatus according to the invention FIG. 2 shows a diagrammatic representation of the flow feeder of the invention and the take-off area FIG. 3 shows a diagrammatic representation of the flow block of the invention.

In accordance with FIG. 1, the raw materials are melted in a melting bath 1, the heated melt passing in its surface region into a forehearth 2. In the forehearth 2, the melt enters into a feeder device, which can be a flow feeder 5 or a flow block 17. From the feeder device, the melt passes to a bushing device having subsequent thread winder devices.

The height of the melt in the melting bath 1 is chosen in accordance with the specified ratio. This process requirement is successfully implemented by means of an apparatus in which the bottom of the melting bath is movable/modifiable to the extent that the ratio of the height ($h_S$) of the melt in the forehearth to the height ($h_W$) of the melt in the melting bath can be set in the range ($h_S$):($h_W$)=(0.8 to 1.1):(2 to 6).

In this case the melting bath bottom 3 can be elevated by the additional incorporation of refractory material during the regular maintenance work on the melting bath. The bottom 3 of the melting bath can also be constructed so as to be mechanically displaceable.

Another possibility for changing the ratio of the melt heights is to imitate a displacement of the bottom 3 in the vertical direction by changing the position of the transition from the flowable to nonflowable melts (corresponding to a "dead zone") in the melting bath 1.

If the height of the melt in the melting bath 1 is greater, the specific energy requirement for producing a homogeneous melt increases. At the region between the melting bath 1 and the forehearth 2, so-called "dead zones", having a very low flow rate, can form in this case. In the case of melting baths which are too flat, insufficiently homogenized melt can pass into the forehearth. Consequently, melt is taken off through the feeder device which is not suitable for fibre formation and the fibre-drawing process breaks off.

In an advantageous implementation of the apparatus, a baffle 15 starting from the forehearth bottom 6 and/or a skimmer block 16 at the height of the melt surface 4 is arranged at the transition region from melting bath 1 to the forehearth 2.

The skimmer block 16 prevents in this case the admission of overheated and/or inhomogeneous melt from the melting bath 1. This separation of the melt layers close to the surface in the melting bath 1 and the forehearth 2 also prevents the development of a "crust" (solidified melt) which makes the heat exchange between the heat transfer agent and the melt more difficult. The baffle 15 prevents the entry of high-viscosity (excessively cold) melt into the forehearth 2 and provides the readiness the provision of a homogeneous melt for take-off from the take-off area 8.

In a further implementation of the process according to FIG. 3, the melt is taken off from the forehearth 2 by a flow block 17, the flow-through orifice 19 being surrounded by a flow ring 18 which ensures take-off of the melt from the take-off area 8 of the melt.

The melt covers the bottom of the forehearth 2 in which the flow block 17 is situated. Beneath the flow block 17 is situated an electrically heated nozzle plate 20 onto which the metered melt runs. At a ratio of the area ($F_\delta$) of the cross-section of the flow-through orifice 19 to the total of the areas ($\Sigma F_D$) of the orifices in the nozzle plate 20 in the range 10–50, optimum conditions are created for fibre formation, i.e. for the development of a stable meniscus. A constant uniformly distributed temperature field in the bushing device improved the quality of the fibres and substantially decreased the breakage rate. The volume of the meniscus is influenced by the following technological parameters: diameter of the nozzle, temperature of the nozzle plate and degree of charge of the melt.

When the upper limit is exceeded, an excess with respect to the fed melt occurs, the liquid head increases and the development of the meniscus is hindered. Consequently, the stability of the fibre-formation process is disturbed. If the ratio of the cross-sectional areas goes below the specified lower limit, the continuous feed of the melt to the forming section can be interrupted, which leads to fluctuations of the fibre diameter up to breakage of individual filaments and to a decrease in the productivity of the fibre-forming unit. The nozzles should have an area of 1.0 to 5.5 $mm^2$. At a lower cross-sectional area, the formation of the meniscus is made more difficult. At larger dimensions, the meniscus transforms into a jet, the diameter of the primary fibres increases, and the breakage rate increases. The melt feed is customarily controlled in this case in such a manner that the specific consumption at an individual nozzle is 0.2–1 g/minute. The fibres are drawn using a take-off device 22.

In an advantageous implementation, the primary fibres pass from the drawing device 22 into a blowing chamber 23, where they are attenuated by the known blowing processes by a hot gas stream to give superfine fibres 25 (diameter less than 7 μm). By means of primary fibres having stable parameters being provided with this procedure for the blowing stage, superfine fibres having low fluctuations in fibre properties and super- and ultrathin fibres (e.g. having diameters of 0.5–2 μm) may be produced.

To produce particularly thick fibres (up to 400 μm), the filaments are taken off downstream of the drawing device. These filaments can be combined to form rovings or can be used in various composite materials.

When a flow block 17 is used instead of a flow feeder 5, this flow block can also optionally be inclined at an angle up to 30°.

The flow feeder 5 shown in FIG. 2 comprises a tube 7 which projects through bottom orifices of the forehearth 2 into the melt. The flow feeder can also, as shown in FIG. 1, comprise a plurality of tubes, the tubes being connected to one another, if appropriate, beneath the forehearth 2 and the tubes being movable in a vertical direction individually or as a group. Each individual tube can be termed a flow feeder, as can also the group of the tubes. In the case of a group, these are movable to the extent that the quotient of the depth of submergence ($h_{ET}$) and the height ($H_O$) of the melt layer above the top edge of the tube is 0.25 to 4.

As already explained, it can be advantageous that a baffle 15 starting from the bottom of the forehearth and a skimmer block 16 passing from the melt surface 4 are arranged in the region of the melt between the melting bath 1 and the forehearth 2.

When the novel group of raw materials are used for mineral fibre production, cheap and ecologically harmless raw materials (rock) are used or ecologically risky materials are converted into an economically utilizable product. Since these raw materials are essentially glass-containing, at the same time there is a reduction in the energy consumption for fusion/melting of the raw materials.

At the same time, the good physical and/or chemical properties due to the chemical composition of the glass melts of the invention may be exploited for novel mineral fibres. These fibres, in comparison to the known glass fibres, have improved physical and chemical properties, e.g. dielectric properties, heat resistance, chemical resistance, mechanical strength.

In addition, some of these mineral fibres have a completely novel complex of properties (combination of properties) which permit novel applications for the use of mineral fibres or can replace expensive special fibres, e.g. reinforcing of cement/concrete, radiation protection, heat insulation in the temperature range up to 900/1000° C., catalyst support etc. This gives the possibility of reducing the extensive development work necessary in matching known glass compositions to the specific profile requirements of a specific application and, via selection of suitable and economical interesting starting materials, fibres with a desired complex of properties my be cost-effectively developed and produced. According to the invention, mineral fibres may be produced which are suitable for the manufacture of threads, rovings, twisted yarns, cords and discrete fibres, which can (in turn) be used for the manufacture of woven fabrics and non-woven webs and non-woven materials of various structures or else in plastic composites and composites in a wide range of technology, such as insulation, electrical technology, car manufacture and building, both individually and in combination with one another and with other materials (e.g. metal, paper, glass fibres, natural fibres).

The invention therefore also relates to the use of a continuous fibre drawn from rock for the manufacture of woven fabrics, non-woven articles and composites and, in particular, to the use of a rock continuous fibre as chopped staple fibre of desired geometric dimensions.

The invention is described in more detail below with reference to examples.

EXAMPLE 1

An andesite basalt having the following composition: 55.7% by weight of $SiO_2$, 19.5% by weight of $Al_2O_3$, 7.91% by weight of CaO, 7.8% by weight of ($Fe_2O_3$+ FeO), 3.9% by weight of MgO, 1.9% by weight of $Na_2O$, 1.57% by weight of $K_2O$, 0.72% by weight of $TiO_2$, 0.13% by weight of $P_2O_5$, 0.11% by weight of MnO was mechanically crushed to a particle size of 40–60 mm and fed to the melting bath 1 of a directly heated furnace. The basalt was fused at a temperature of 1165–1375° C. To improve the homogeneity of the melt, the temperature in the melting bath can be increased up to 1450° C. The melting bath 1 was connected to a forehearth 2. The melt was taken off for fibre formation through the flow feeder 5. The ratio of the depth of submergence of the flow feeder tube to the height of the melt above its upper edge in the forehearth was 1.4. The melt was fed via the tube 7 of the flow feeder 5 to the bushing 10 having 200 nozzles. The melt was processed in the bushing in the temperature range 1390–1450° C.

The processed basalt melt was characterized by the following parameters:

The processing range of the melt 60 K;
Difference between liquidus temperature and lower processing temperature: 160 K;
Viscosity at 1300° C.=1000 d Pa s;
Viscosity at 1450° C.=150 d Pa s;
Quotient η[Pa.s]/ν [N/m]=50;
Energy of activation of viscous flow ($E_\eta$)=240 KJ/mol.

To draw the continuous filaments 11 from the melt situated in the Pt—Rh-bushing 10, the primary fibres exiting from the nozzles were wound onto a thread winder device 14. The drawn basalt fibres had a diameter of 7–15 μm. Under production conditions, a breakage rate of 0.8 breakages per kg of fibres was achieved, which enables further processing as textile. The fibres were processed to a woven fabric and used for plastics reinforcement.

The apparatus used was characterized by the following parameters:

The ratio of the melt surfaces ($F_W$):($F_S$)=0.64.
The ratio of the forehearth to the width of the melting bath ($B_S$):($B_W$) was 1:5.
The ratio of the height ($h_S$) of the melt in the forehearth to the height ($h_W$) of the melt in the melting bath was 1:4.

EXAMPLE 2

Continuous mineral fibres were produced according to the invention from power station ash with addition of chalk. The fly ash comprised about 43.6% by weight of $SiO_2$, 16.2% by weight of $Al_2O_3$, 1.6% by weight of $Fe_2O_3$, 5.25% by weight of FeO, 0.7% by weight of $LiO_2$, 26.7% by weight of CaO, 3.11% by weight of MgO, 0.67% by weight of $K_2O$ and 2.17% by weight of other constituents.

In a pilot plant, continuous fibres having a diameter of 15 μm were produced from about 65% fly ash, corresponding to the composition quoted with addition of chalk.

EXAMPLE 3

On a laboratory scale, continuous fibres having a diameter of 7–8 mm were drawn according to the invention at a processing temperature of 1100–1300° C. from an technical glass waste (fluorescent tubes) of the following composition: 72.0% by weight of $SiO_2$, 18.0% by weight of $(Na_2O+K_2O)$, 8.0% by weight of $(CaO+MgO+BaO)$, 2.0% by weight of $Al_2O_3$, <0.01% by weight of FeO and traces of PbO, $Sb_2O_3$, $As_2O_3$, Cd, Tl and other constituents.

List of the Reference Numbers and Terms Used 1 melting bath
2 forehearth
3 bottom of the melting bath
4 melt surface
5 flow feeder
6 bottom of the forehearth
7 tube
8 take-off area
9 outlet
10 bushing
11 fibre (filament)
12 thread
13 sizing application
14 thread winder device
15 baffle
16 skimmer block
17 flow block
18 flow ring
19 flow-through orifice
20 nozzle plate
21 primary fibres
22 drawing device
23 blowing chamber
24 blast burner
25 superfine short fibres
26 fibre roving
$h_S$—height of the melt in the forehearth
$h_W$—height of the melt in the melting bath
$h_{ET}$—depth of submergence of the tube
$h_O$—height of the melt layer above the upper edge of the tube in the forehearth

What is claimed is:

1. Process for producing mineral fibers from rock, vitreous technical wastes or technical glass wastes, in which after the mechanical separation of non-glass-containing and predominantly glass-containing products the predominantly glass-containing products having a particle size of less than 80 mm are melted at 1050° C. to 1480° C. in a melting bath (1), where the melting bath (1) is connected to a forehearth (2) in such a manner that flow of the melt from the melting bath (1) into the forehearth (2) is enabled between melting bath (1) and forehearth (2) in the surface area of the melt, and where the melt is fed from the forehearth (2) to a feeder device, and where the melt is fed from the feeder device to a bushing device arranged there below and is taken off from there as filament with simultaneous solidification, comprising feeding the melt to the feeder device from a take-off area (8) of the melt in which the melt complies with the following conditions:

a) the processing range of the melt is 40 to 100 K,
b) the melt viscosity at 1450° C. is 30 to 160 dPa.s,
c) the melt viscosity at 1300° C. is 200 to 1500 dPa.s,
d) the quotient of the viscosity (in Pa.s) and the surface tension (in N/m) is between 10 and 100,
e) the energy of activation of the viscous flow of the melt is no greater than 290 kJ/mol; and
f) the ratio of the height ($h_S$) of the melt in the forehearth to the height ($h_W$) of the melt in the melting bath is ($h_S$):($h_W$)=(0.8 to 1.1):(2 to 6): and
g) the ratio of the area of the melt surface (4) in the melting bath (1) to the area of the melt surface (4) in the forehearth (2) is 0.5 to 1.5.

2. Process according to claim 1, wherein the quotient of the area ($F_w$) of the melt surface (4) in the melting bath (1) and of the area ($F_s$) of the melt surface (4) in the forehearth is ($F_w$):($F_s$)=0.5 to 1.5.

3. Process according to claim 1, wherein the ratio of the width ($B_S$) of the forehearth (2) to the width ($B_W$) of the melting bath ($B_S$):($B_W$)=(0.8 to 1):(5 to 12).

4. Process according to claim 1, wherein the ratio ($h_S$):($h_W$)=(0.8 to 1):(2.5 to 5).

5. Process according to claim 2, wherein the ratio ($F_W$):($F_S$)=0.6 to 1.3.

6. Process according to claim 1, wherein the conditions in the take-off area (8) of the melt are maintained as follows
the processing range of the melt is 60 to 80 K
the melt viscosity at 1300° C. is 200–1000 dPa.s
the melt viscosity at 1450° C. is 40–150 dPa.s,
the energy of activation of viscous flow of the melt is no greater than 270 kJ/mol.

7. Process according to claim 1, wherein the predominantly glass-containing products o rock are used without further additives.

8. Process according to claim 1, wherein the melt is transferred from the melting bath (1) into the forehearth (2) via a baffle (15) arranged at the start of the forehearth (2).

9. Process according to claim 1, wherein the melt is fed from the forehearth (2) to a flow feeder (5) or a flow block (17) as feeder device.

10. Process according to claim 1, wherein the melt is fed to a flow feeder (5) which comprises an open tube (7) or a group of open tubes (7) which are arranged in the bottom of the forehearth (2), where the upper end of each tube (7) is open and inserts into the melt of the forehearth (2) up to the take-off area (8), and where the lower end of each tube (7) is open so that at least the melt situated above the tube (7) enters into the tube (7) and runs to the bushing device arranged beneath it.

11. Process according to claim 10, wherein the melt is introduced into one or more tubes (7) of a flow feeder (5), the top edge of which is in the take-off area (8) of the melt.

12. Process according to claim 10, wherein the melt enters into the tubes (7) of the flow feeder (5) through orifices in the curved surface of the tubes (7) and through the ends of the tubes (7) which are open at the top, all orifices lying in the take-off area (8) of the melt.

13. Process according to claim 1, wherein the temperature and/or the viscosity or rock melt is dependent on the ratio $Fe^{2+}$ to $Fe^{3+}$ by controlling the redox conditions in the melting unit.

14. Process according to claim 1, wherein the fibers are drawn to form a continuous fibre having a filament diameter in the range of 2 to 400 μm.

15. Process according to claim 14, wherein the continuous fibre is a basalt fibre.

16. Process for the manufacture of mineral fibres from rock, vitreous technical wastes or technical glass wastes according to claim 1, in which after the mechanical separation of non-glass-containing and predominantly glass-containing products the predominantly glass-containing products having a particle size of less than 80 mm are melted at 1050 to 1480° C. in a melting bath (1), where the melting bath (1) is connected to a forehearth (2) in such a manner that flow of the melt from the melting bath (1) into the forehearth (2) is enabled between melting bath and forehearth in the surface area of the melt, and where the melt is fed from the forehearth (2) to a feeder device, and where the melt is fed from the feeder device to a bushing device arranged there below and is taken off from there as filament with simultaneous solidification, wherein the melt is fed to the feeder device from a take-off area (8) of the melt in which the melt complies with the following conditions:

a) the processing range of the melt is 40 to 100 K,
b) the melt viscosity at 1450° C. is 30 to 160 dPa.s,
c) the melt viscosity at 1300° C. is 200 to 1500 dPa.s,
d) the quotient of the viscosity (in Pa.s) and the surface tension (in N/m) is between 10 and 100,
e) the energy of activation of the viscous flow of the melt is no greater than 290 kJ/mol; and
f) the ratio of the height ($h_S$) of the melt in the forehearth to the height ($h_W$) of the melt in the melting bath is ($h_S$):($h_W$)=(0.8 to 1.1):(2 to 6);
g) the ratio of the area of the melt surface (4) in the melting bath (1) to the area of the melt surface (4) in the forehearth (2) is 0.5 to 1.5;
h) the difference between the lower processing temperature and the liquidus temperature of the melt is not less than 50 K;

and in which the filaments are drawn beneath the bushing device by a hot gas stream conducted horizontally and/or at an incline to the drawing direction to form short fibres having a diameter of 0.5 to 7 μm.

17. Process according to claim 14, wherein the fibers are drawn to form a continuous fibre having a filament diameter in the range of 5 to 150 μm.

18. Process according to claim 14, wherein the fibers are drawn to form a continuous fibre having a filament diameter in the range of 5 to 25 μm.

19. Process according to claim 9, wherein the melt is fed from the forehearth (2) to the flow block (17) which has a flow-through orifice (19) in its central region and wherein the ratio of the cross-section ($F_o$) of the flow-through orifice to the total area ($\Sigma F_D$) of the nozzle orifices/cross-section of the nozzles in a nozzle plate is ($F_o$):($\Sigma F_D$)=10–50.

* * * * *